July 23, 1968

R. P. SNYDER 3,393,834

APPARATUS FOR THE PREPARATION OF FIBER REINFORCED PLASTICS

Filed Jan. 28, 1966

INVENTOR.
Robert P. Snyder
BY
AGENT

United States Patent Office 3,393,834
Patented July 23, 1968

3,393,834
APPARATUS FOR THE PREPARATION OF FIBER REINFORCED PLASTICS
Robert P. Snyder, Saginaw, Mich., assignor to The Dow Chemical Company, Midland, Mich., a corporation of Delaware
Filed Jan. 28, 1966, Ser. No. 523,640
5 Claims. (Cl. 222—64)

ABSTRACT OF THE DISCLOSURE

An apparatus is disclosed which is suitable as an alarm in a hopper containing granular material. A pivoted hood on a switch or similar actuator body provides minimum level indication and is not readily fouled by downwardly feeding granular material.

---

Figure 1:
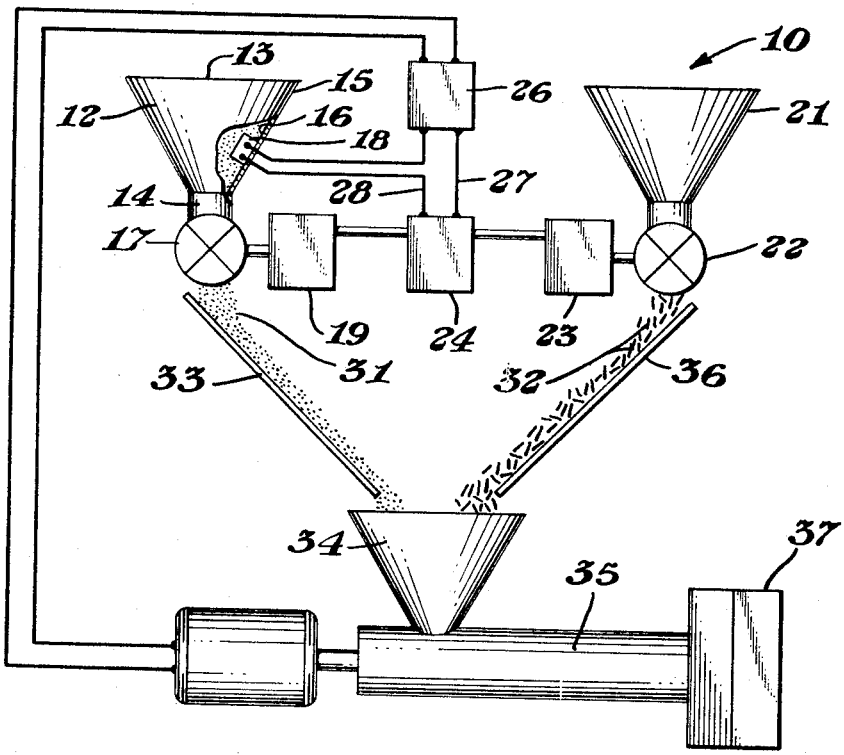

This invention relates to improved apparatus for the preparation of fiber reinforced plastics and more particularly relates to an improved apparatus useful in the preparation of fiber reinfoced plastics.

One desirable method of fabricating fiber reinforced plastic articles is by a process which is sometimes referred to as extrusion molding or injection molding with a screw pre-plasticizer. In such a process, chopped fiber reinforcing such as glass fiber and a particulate synthetic resinous material are simultaneously fed to the hopper or feed port of a heat-fabricating machine of the masticating or malaxating variety which is capable of extrusion and/or injection molding of a heat-plastified mixture of the synthetic resinous material and the reinforcing fiber. It is extremely important in such an operation that the feed rates of the fiber and the resinous plastic material be controlled to provide the desired ratio of reinforcing agent to plastic material. It is also extremely important that in the feeding of such materials to an extrusion operation that the feeding be done at a rate about equal to the removal of the materials from the feed port in order that the materials cannot accumulate in the feed port and stratification of the granular material and the fiber reinforcing does not occur. It is extremely serious if for some reason the reinforcing material alone is fed to the heat-fabricating apparatus without sufficient thermoplastic resinous material to lubricate a screw rotating within the barrel. If glass fiber alone is fed to a screw pre-plasticizing injection molding apparatus, considerable damage may be done to the barrel and screw by the presence of an excess of glass fiber.

It is an object of this invention to provide an improved apparatus for the preparation of the fiber reinforced plastic materials.

It is a further object of this invention to provide an apparatus which assures an adequate supply of synthetic resinous material to the heat-fabricating apparatus.

It is also an object of this invention to provide an improved hopper level control particularly adapted to operate in the presence of granular material.

These benefits and other advantages in accordance with the present invention are achieved in an apparatus for the fabrication of shaped articles of filament reinforced synthetic resinous material which comprises in cooperative combination a resin supply means having a sloping internal wall, a controlled discharge means discharging to a feed inlet of a heat-plastifying machine having at least one screw rotating within a barrel, a chopped reinforcing filament supply means so constructed and arranged so as to supply a chopped filamentary reinforcing material to the feed inlet of the heat-fabricating machine, a feed controller controlling the discharge rate of the resin supply and the discharge rate of the chopped filament reinforcement supply, an actuator disposed within the sloping wall of the resin supply means, the actuator having a control element disposed remote from the sloping wall, the control element having an upper end and a lower end, the upper end being disposed remotely from the resin supply means discharge, a hood pivotally mounted to the upper end of the actuator and adapted to pivot about an axis which is generally parallel to the resin supply means wall at a location where the actuator is mounted, the hood having a first or upper end, two sides and a top, the hood enclosing at least a portion of the actuator and being freely pivoted thereon, the hood being spaced from the nearest adjacent portions of the actuator body by a distance at least three times the diameter of the resin particles being handled, the hood having insufficient weight to activate the actuator but on depressing the hood toward the body of the actuator by a force other than the force of gravity actuating the actuator.

Further features and advantages of the present invention will become more apparent from the following specification when taken in connection with the drawing wherein:

In FIGURE 1 there is schematically illustrated an apparatus in accordance with the present invention suited for the preparation of filamentary reinforced plastic objects.

Figure 2:
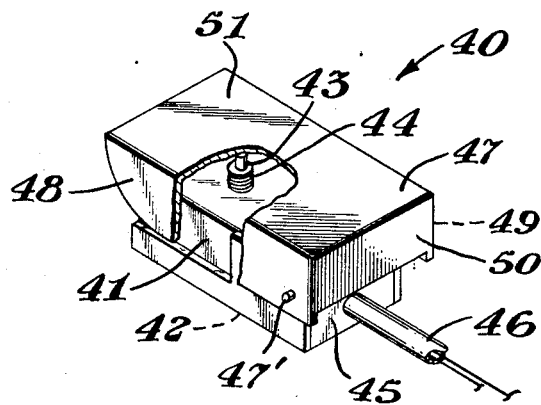

FIGURE 2 is a cutaway view of a portion of the apparatus schematically represented in FIGURE 1.

In FIGURE 1 there is schematically depicted on apparatus in accordance with the present invention generally designated by the reference numeral 10. The apparatus 10 comprises in cooperative combination a particulate resin supply means or hopper 12 having an upper or open end 13 and a lower or discharge end 14. The hopper 12 has an upwardly and outwardly sloping wall 15 having an inner surface 16. A control discharge means 17 is in operative communication with the discharge end 14 of the hopper 12. An actuator 18 is disposed on the inner surface 16 of the wall 15 of the hopper 12. A resin supply discharge control means 19 is operatively connected to the discharge means 17. Generally adjacent the resin supply means 12 is a reinforcing filament supply 21, the filament supply 21 has a control discharge means 22 adapted to discharge comminuted or chopped fiber reinforcing. The discharge means 22 is controlled by the discharge control 23. The discharge controls 19 and 23 are in operative communication with a rate controlling means 24 which in turn is in operative communication with a power source 26 by means of the lines 27 and 28. The line 28 is in series with the actuator 18 which serves to permit or disrupt the flow of power from the power source 26 to the rate controlling means 24. A stream of particulate thermoplastic resinous material 31 is issuing from the discharge means 17 and a stream of comminuted filamentary reinforcing material 32 is shown issuing from the discharge means 22. A first deflector 33 deflects the stream 31 into the feed hopper 34 of the heat-fabricating machine 35. Beneficially, the heat-fabricating machine 35 contains a heat-plastifying section containing a rotating screw within the barrel which is in communication with the supply means 34. A second deflector 36 is disposed generally adjacent the discharge means 22 and deflects the stream 32 into feed hopper 34. The streams 31 and 32 are admixed within heat-fabricating apparatus 33, heat-plastified, and subsequently discharged into a shaping means or mold 37.

In operation of the apparatus of FIGURE 1, synthetic resinous material in a suitable granular form is positioned within the supply means 12 and filamentary reinforcing material within the supply 21. The weight of the resinous material within the supply means 12 causes the actuator 18 to permit flow of power in the line 28, causing the discharge means 17 and 22 to discharge at relative rates determined by the controllers 19 and 23 and at an absolute rate by the controller 24. The power source 26 is actuated by the heat-fabricating machine 35 and at appropriate times in the cycles is activated and deactivated to provide a flow of moldable material or to stop the flow of moldable material. Regardless of the period in the molding or forming cycle, if the level of the resin in the supply means 12 falls below the level of the actuator, the power is cut off from the controller 24 and the flow of filamentary reinforcing and the flow of resin is stopped, thus preventing the inadvertent filling of the heat-fabricating apparatus by means of a stream of the filamentary reinforcing alone which would result in costly damage to the apparatus.

In FIGURE 2 there is illustrated an isometric cutaway representation of one embodiment of an actuator assembly generally designated by the reference numeral 40 and particularly suited and adapted for the practice of the present invention. The actuator assembly 40 comprises an actuator 41 having a bottom or mounting face 42 adapted to contact a wall of a supply means or hopper such as the inner surface 16 of the wall 15 of FIGURE 1. An actuating means 43 is remotely disposed from the bottom 42 and extends generaly normally therefrom. Advantageously, the actuating means 43 is maintained in a position remote from the bottom of 42 by a resilient tensioning means or spring 44. The actuator has an upper end surface 45 into which a conduit or line 46 is operatively affixed. A hood 47 is pivotally affixed to the actuator 41 by means of a pivot 47'. The hood 47 is adapted to pivot about an axis generally parallel to a line parallel to the upper end 45. The hood 47 comprises a first side 48, a second side 49, an upper end 50, and a face 51. The sides 48 and 49 and 50 are spaced from the actuator 41 by a distance of at least three diameters (or maximum linear dimension) of the desired particulate particles in which the actuator is to operate. The resilient tensioning means 44 is so constructed and arranged so as to maintain the actuator 43 in a position remote from the bottom of 42 when the hood 47 contacts the actuator 43 by means of gravity alone. The area of the upper surface 49 is such that when particulate material is contacted therewith when positioned on the sloping wall of a hopper such as is the actuator 18 of FIGURE 1. The pressure of the particulate material is sufficient to depress the hood 47 and the actuator 43 permitting power to flow in the line 46. The spacing of the hood 47 from the body of the actuator 41 is critical, as is the fact that the sides 48, 49 and 50 surround a portion of the sides and upper end 45 of the actuator 41. This configuration effectively prevents granular material from contacting the surface of the activator remote from the bottom 42. The configuration also permits ready clearance of the actuator if from any unusual vibration a granule or cube should find its way under the hood. The sensitivity of the actuator assembly 40 is readily varied by changing the area of the upper surface 51. Beneficially, this may be accomplished by the simple expedient of employing a larger hood or adding a flat plate or a light or heavy material of desired size. The actuator 41 may be any one of many varieties of actuators. For example, one particularly advantageous actuator is a snap action switch having a small protrusion actuating button, leaf or leaf and roller on the face remote from the bottom and eminently adapted to engage a hood such as the hood 49. Such switches are readily obtained which respond to pressures of a half ounce to several ounces. Beneficially, such a switch may be of the normally open, normally closed or the single pole-to-pole throw variety depending upon the particular control circuitry desired. In the simplified illustration of FIGURE 1, a normally open switch would be employed if the rate controller 24 were a motor with a variable speed output mechanically coupled to control means 19 and 23 which would be variable speed mechanical transmissions. Alternately, hydraulic or pneumatic pilot valves may be utilized as actuators and opened or closed by the variation in position of the hood 47. In corrosive atmospheres, a suitable actuator can be the capacitor or a capacitance bridge or an inductor or capacity for an oscillator controlled mechanism. For most granular materials, particularly granular materials which are synthetic thermoplastic resins commercialy available, minature snap action switches such as are illustrated in FIGURE 2 with the spring internally disposed are eminently suitable.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. Apparatus for the fabrication of shaped articles of filament reinforced synthetic resinous material which comprises in cooperative combination:

a resin supply means having an internal sloping wall, an open end and a discharge end, the discharge end discharging to a controlled discharge means, the discharge means discharging to a feed inlet of a heat-plastifying machine having at least one screw rotating within a barrel, a chopped reinforcing filament supply means so constructed and arranged so as to supply a stream of chopped filamentary reinforcing material to the feed inlet of the heat fabricating machine, a feed controller controlling the discharge rate of the resin supply and the discharge rate of the chopped filament reinforcing supply, an actuator disposed within the internal sloping wall of the resin supply means generally adjacent the discharge end thereof, the actuator being in operative connection with the feed controller, the actuator having a control element disposed remote from the sloping wall, the control element having an upper end and a lower end, the upper end being disposed remotely from the resin supply means discharge, a hood pivotally mounted to the upper end of the actuator and adapted to pivot about an axis which is generally parallel to the resin supply means wall at a location where the actuator is mounted, the hood having a first or upper end, two sides and a top, the hood enclosing at least a portion of the actuator and being freely pivoted thereon, the hood being spaced from the next adjacent portions of the actuator body by a distance at least three times the diameter of the resin particles being handled, the hood having insufficient weight to activate the actuator but on depressing the hood toward the body of the actuator by a force other than the force of gravity actuating the actuator.

2. The apparatus of claim 1 wherein the actuator is an electrical switch and the electrical switch has a control element in engagement with the hood.

3. The apparatus of claim 1 wherein the hood extends at least the entire length of the actuator body and the top of the hood is spaced from the nearest adjacent surface of the actuator body by a distance of at least three times the particle diameter.

4. The apparatus of claim 1 wherein the hood has a generally rectangular configuration.

5. The apparatus of claim 1 wherein the actuator is an electrical switch which is opened or closed by the movement of an element along an axis which is generally normal to a plane containing the axis of the hood pivot wherein the hood pivot is adjacent the open end of the resin supply means.

References Cited

UNITED STATES PATENTS

| | | | |
|---|---|---|---|
| 848,519 | 3/1907 | Versteeg | 200—61.21 |
| 2,475,404 | 7/1947 | Reed. | |
| 3,228,561 | 1/1966 | Rosenberg | 222—139 X |

FOREIGN PATENTS

| | | |
|---|---|---|
| 1,301,474 | 7/1962 | France. |

ROBERT B. REEVES, *Primary Examiner.*

F. R. HANDREN, *Assistant Examiner.*